United States Patent
Hamby et al.

(10) Patent No.: US 10,410,181 B2
(45) Date of Patent: Sep. 10, 2019

(54) USING A VEHICLE'S ON-BOARD DIAGNOSTIC (OBD) SYSTEM FOR AUDIO REMINDERS

(71) Applicant: Verizon Patent and Licensing Inc., Arlington, VA (US)

(72) Inventors: Benjamin Hamby, Atlanta, GA (US); Sneha Akula, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 104 days.

(21) Appl. No.: 15/831,937

(22) Filed: Dec. 5, 2017

(65) Prior Publication Data

US 2019/0172015 A1 Jun. 6, 2019

(51) Int. Cl.
*G06Q 10/10* (2012.01)
*B60Q 9/00* (2006.01)
*H04W 4/80* (2018.01)
*H04W 4/04* (2009.01)

(52) U.S. Cl.
CPC ............. *G06Q 10/109* (2013.01); *B60Q 9/00* (2013.01); *H04W 4/04* (2013.01); *H04W 4/80* (2018.02)

(58) Field of Classification Search
CPC ........ G06Q 10/109; H04W 4/80; H04W 4/04; B60Q 9/00
See application file for complete search history.

(56) References Cited

U.S. PATENT DOCUMENTS

| | | | |
|---|---|---|---|
| 7,904,219 B1* | 3/2011 | Lowrey | G01C 21/26 701/32.3 |
| 9,338,605 B2* | 5/2016 | Guba | H04W 4/027 |
| 9,743,260 B2* | 8/2017 | Wilson | H04W 4/14 |
| 2011/0269441 A1* | 11/2011 | Silver | H04W 4/027 455/418 |
| 2014/0309806 A1* | 10/2014 | Ricci | B60Q 1/00 701/1 |
| 2017/0188110 A1* | 6/2017 | Cansino | H04N 21/4882 |
| 2018/0359298 A1* | 12/2018 | Grimm | H04L 65/1059 |

* cited by examiner

*Primary Examiner* — Mohamed Barakat

(57) ABSTRACT

A method, performed by an on-board diagnostic (OBD) interface coupled to a diagnostic port of a vehicle, including receiving, via a wireless network, a message containing text from a user device associated with a user; converting the text contained in the message into an audio file that corresponds to an audio reminder; detecting a key-on event for the vehicle; establishing, responsive to the key-on event, a first wireless connection to a speaker device located in the vehicle; sending, via the first wireless connection, a notification to the speaker device that the audio reminder is pending; terminating, after the notification is sent, the first wireless connection; establishing a second wireless connection to the speaker device; and transferring the audio file to the speaker device via the second wireless connection.

20 Claims, 7 Drawing Sheets

USING A VEHICLE'S ON-BOARD DIAGNOSTIC (OBD) SYSTEM FOR AUDIO REMINDERS

BACKGROUND INFORMATION

A vehicle's on-board diagnostics (OBD) system may be equipped with a serial connection interface, such as an OBD or an OBD-II port, which is configured to connect an engine control module (ECM) to a diagnostics reader that collects vehicle information (e.g., performance and/or tracking data). The diagnostics or OBD-II reader may include a transceiver configured to communicate via a network to a client server per a telematics subscription service that may be accessible to a subscriber via an application on a mobile device (e.g., cell phone). The OBD-II reader may also be configured to wirelessly connect to a speaker device or console device in the vehicle to functionally provide "travel companion services" to the vehicle's occupant(s).

DETAILED DESCRIPTION OF PREFERRED EMBODIMENTS

Figure 1:
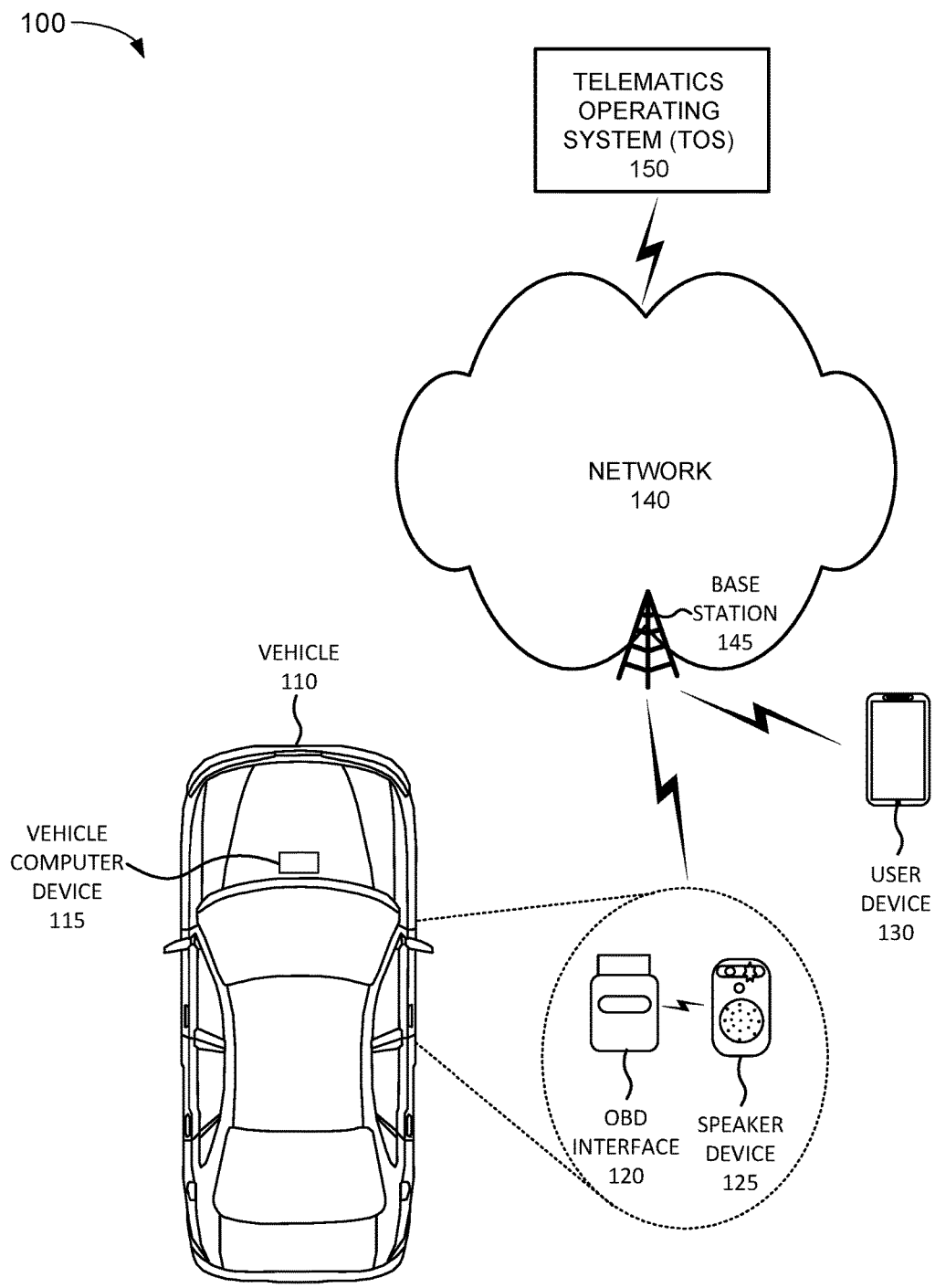
FIG. 1 is a diagram illustrating an environment according to an implementation described herein.

The following detailed description refers to the accompanying drawings. The same reference numbers in different drawings identify the same or similar elements.

Implementations described herein relate to using a motor vehicle's OBD system to present audio messages (e.g., reminders) to an operator and/or occupant of the motor vehicle. In some implementations, text data created and/or received at a user device executing a telematics application associated with a subscriber, may be transmitted via a network to a client server associated with a telematics service provider. The client server may identify the text data as a "reminder" for the subscriber, and identify an OBD-II reader associated with the subscriber. The client server may transmit the message via the network to the OBD-II reader on board a vehicle. The message may be converted to an audio file by the client server and/or the OBD-II reader and stored by the OBD-II reader. Upon detection by the OBD-II reader of a "key-on" event, or user input from an operator/occupant of the vehicle responsive to a pending message notification presented via a speaker device located in the vehicle, the OBD-II may wirelessly transmit the message to the speaker device. The speaker device may automatically, and/or in response to user action, output the message.

As an example, assume that a user of a mobile phone, who is a subscriber of a telematics service, receives a text message via a text messaging application (app), for example, from someone asking the subscriber to "remember to pick up milk" on the way home from the office. So as not to forget, the subscriber enters the reminder into a calendar app on the mobile phone, and sets the notification for 6:00 p.m., which is the time that the subscriber expects to leave the office. At the same time, a telematics app executing on the mobile phone in the background parses the text message and identifies terms such as "remember" and either automatically designates the message as a "reminder" and/or asks the subscriber to confirm the designation. When confirmed, the telematics app forwards the message via a wireless network to a telematics operating system (TOS). In another embodiment, the telematics app accesses the user-created reminder from the calendar app on the mobile phone.

The TOS identifies, from the message, the subscriber and/or the mobile phone and identifies a corresponding OBD interface mounted to an OBD port in the subscriber's vehicle. The TOS contacts the OBD interface via the wireless network and forwards the message over the connection. The OBD interface receives the message and converts the message and stores it as an audio reminder. Meanwhile, the subscriber leaves the office early (i.e., before 6:00 p.m.) and when the subscriber drives the vehicle, the OBD interface detects a "key-on" event for the vehicle and automatically sets up a Bluetooth™ connection to a speaker device, for example, clipped to a sun visor and/or integrated into the vehicle's radio/stereo system. Using the Bluetooth™ connection, the OBD forwards the audio reminder and the speaker device automatically plays the audio reminder, reminding the subscriber to pick up the milk. Whereas, the notification set using the phone's calendar app may fail to provide a timely reminder to the subscriber given that it is time dependent, the telematics app functions to provide a timely reminder based on the "key-on" event.

FIG. 1 is a diagram illustrating exemplary components of an environment 100 according to an implementation described herein. As shown in FIG. 1, environment 100 may include a vehicle 110, an on-board diagnostics (OBD) interface 120, a speaker device 125, a user device 130, a network 140, and a telematics operating system (TOS) 150.

Vehicle 110 may include a car, a sports utility vehicle (SUV), a truck, a van, and/or another type of motor vehicle (e.g., a boat or aircraft). Vehicle 110 may be a passenger vehicle and/or another vehicle used for any purpose by an operator. Vehicle 110 includes a cabin that seats the operator and one or more passengers ("occupants"). An occupant of vehicle 110 may be a subscriber to a telematics subscription service (e.g., HUM, by Verizon). Furthermore, vehicle 110 may include a vehicle computer device 115.

Vehicle computer device 115 may manage one or more functions of vehicle 110 and/or may collect information relating to vehicle 110. For example, vehicle computer device 115 may include an ECM, an engine control unit (ECU) or another powertrain control module (PCM). Vehicle computer device 115 may manage the functionality of various components of vehicle 110; collect data about the status of the components of vehicle 110; report error and/or trouble codes received from components of vehicle 110; generate maintenance schedule notifications for vehicle 110; and/or collect telematics information relating to vehicle 110 such as the location of vehicle 110, performance monitoring of vehicle 110, emergency incident detection, etc., for example, in real-time. Vehicle computer device 115 may obtain sensor information from one or more sensors located in vehicle 110, such as an accelerometer, a voltage meter, a dashboard camera, and/or other types of monitoring devices. Furthermore, vehicle computer device 115 may collect sensor information that may be used for determining a "key-on" status and a "key-off" status for vehicle 110.

OBD interface 120 may include a device, such as a dongle device, that may connect to (e.g., be plugged into) an OBD port in vehicle 110, such as an OBD-II port or another type of OBD port. The OBD port may be located, for example, inside vehicle 110, such as on the dashboard, under the steering wheel, or in another location. OBD interface 120 may interface with vehicle computer device 115 and/or with other vehicle components of vehicle 110, may obtain diagnostics and/or telematics information about vehicle 110, and may report the obtained information to TOS 150. OBD interface 120 may interface with sensors, such as an accelerometer and/or a voltage meter that may be used to determine the key-on and/or key-off events.

Furthermore, OBD interface 120 may include electronics (e.g., a transceiver) for wired and/or wireless network connectivity (e.g., short-range and/or long-range) that enables OBD interface 120 to collect, store, and exchange data. Long-range network connectivity may include, for example, Wi-Fi and/or cellular network connectivity, and enable communication with TOS 150 via network 140 and/or another network device. Short-range network connectivity may include, for example, Bluetooth™ and/or Bluetooth™ Low Energy (BLE) connectivity, and enable communication with speaker device 125 and/or user device 130.

Speaker device 125 may include an audio device that wirelessly connects via to OBD interface 120 using a short range wireless communication protocol (e.g., Bluetooth™, WiFi, etc.). Speaker device 125 may be capable of receiving information, such as audio files, from OBD interface 120, and outputting audio for an occupant of vehicle 110, when speaker device 125 is located in vehicle 110 (e.g., mounted to a visor and/or a console, etc.). Speaker device 125 may be battery operated and configured to send and/or receive data via a lower power transceiver. In other implementations, speaker device 125 may be part of vehicle 110's radio/speaker system.

In some implementations, speaker device 125 may include one or more visual indicators (e.g., light-emitting diode (LED) display, liquid-crystal display (LCD), icons, etc.) to display information received from OBD interface 120, for example, that is related to the audio information, to an operator and/or occupant of vehicle 110. Speaker device 125 may include one or more input devices (e.g., button, switch, keypad, motion sensor, etc.) for use by an occupant of vehicle 110 for controlling one or more functions (e.g., power, volume, signaling, etc.) of speaker device 125.

User device 130 may be associated with an occupant of vehicle 110, the subscriber of a telematics subscription service. User device 130 may include a mobile communication device such as a mobile phone, a smart phone, a tablet computer, a laptop computer, a phablet computer device, a wearable computer device (e.g., a glasses smartphone device, a wristwatch smartphone device, etc.), and/or any other type of mobile computer device with wireless communication and output capabilities. User device 130 may communicate with TOS 150 via network 140 using a wireless access point (e.g., base station 145), for example, by executing an application, resident on user device 130, relating to a telematics subscription service. In one embodiment, user device 130 may communicate with OBD interface 120 using a short range wireless communication protocol (e.g., Bluetooth™, WiFi, etc.).

Network 140 may include one or more circuit-switched networks and/or packet-switched networks. For example, network 140 may include a local area network (LAN), a wide area network (WAN), a metropolitan area network (MAN), a Public Switched Telephone Network (PSTN), an ad hoc network, an intranet, the Internet, a fiber optic-based network, a wireless network, a satellite network, and/or a combination of these or other types of networks. Network 140 may include base station 145.

Base station 145 may function as an access point that enables vehicle computer device 115, OBD interface 120, and/or user device 130 to wirelessly connect to network 140. For example, base station 145 may include a Long Term Evolution (LTE) eNodeB base station, a Global System for Mobile Communications (GSM) base station, a Code Division Multiple Access (CDMA) base station, and/or another type of base station.

TOS 150 may include one or more devices, such as computer devices and/or server devices, which may be configured to receive telematics information from OBD interface 120 and/or from vehicle computer device 115. Furthermore, in some implementations, TOS 150 may perform some or all of the processing for retrieving one or messages and/or reminders from user device 130 and providing audio output of the one or messages and/or reminders to people in vehicle 110. In other implementations, TOS 150 may receive information identifying one or more persons associated with vehicle 110, OBD interface 120, and/or user device 130, according to a telematics subscription service. TOS 150 may interface with other systems (not shown in FIG. 1), such as a system (Nuance™) that converts text messages and/or data messages into audio files and may provide the audio files to OBD interface on-board vehicle 110.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
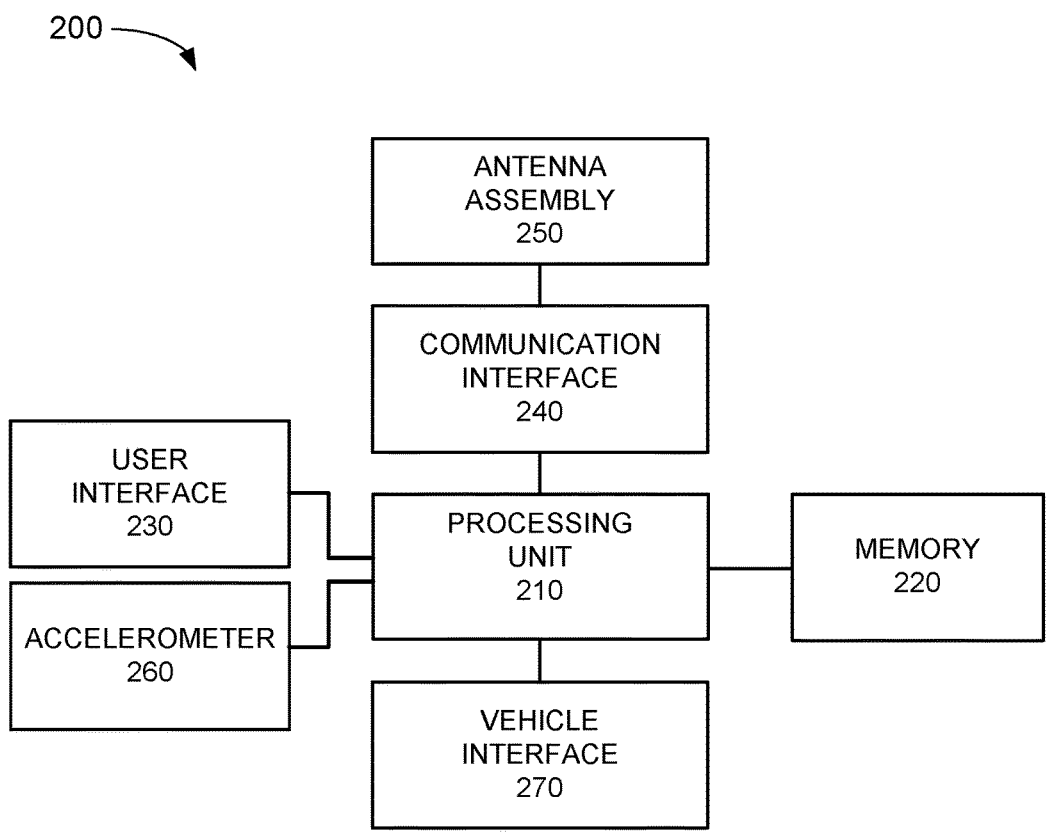
FIG. 2 is a diagram illustrating exemplary components of the on-board diagnostics (OBD) interface, user device, vehicle computer device, speaker device, and/or telematics operating system (TOS) of FIG. 1.

FIG. 2 is a diagram illustrating exemplary components of device 200 according to an implementation described herein. Vehicle computer device 115, OBD interface 120, speaker device 125, and/or user device 130 may each include one or more devices 200. As shown in FIG. 2, device 200 may include a processing unit 210, a memory 220, a user interface 230, a communication interface 240, and an antenna assembly 250. If device 200 is included in OBD interface 120, device 200 may further include an accelerometer 260 and a vehicle interface 270.

Processing unit 210 may include one or more processors, microprocessors, application specific integrated circuits (ASICs), field programmable gate arrays (FPGAs), and/or other processing logic. Processing unit 210 may control operation of device 200 and one or more of its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 200 to vibrate; a sensor; and/or any other type of input or output device.

Communication interface 240 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals via an antenna and receive RF signals from an antenna and provide them to communication interface 240.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Accelerometer 260 may be configured to measure acceleration of device 200. Accelerometer 260 may include a piezoelectric, piezoresistive, capacitive, micro electro-mechanical system (MEMS), and/or another type of accelerometer 260. Accelerometer 260 may record vibrations of device 200 in response to operation and/or movement of vehicle 110.

Vehicle interface 270 may include one or more ports and associated logic to communicate with vehicle computer device 115 and/or other electronic components of vehicle 110. For example, vehicle interface 270 may include an OBD I port, an OBD II port, and/or another type of vehicle interface.

Although FIG. 2 shows exemplary components of device 200, in other implementations, device 200 may include fewer components, different components, differently arranged components, or additional components than those depicted in FIG. 2. Additionally or alternatively, one or more components of device 200 may perform the tasks described as being performed by one or more other components of device 200.

Figure 3:
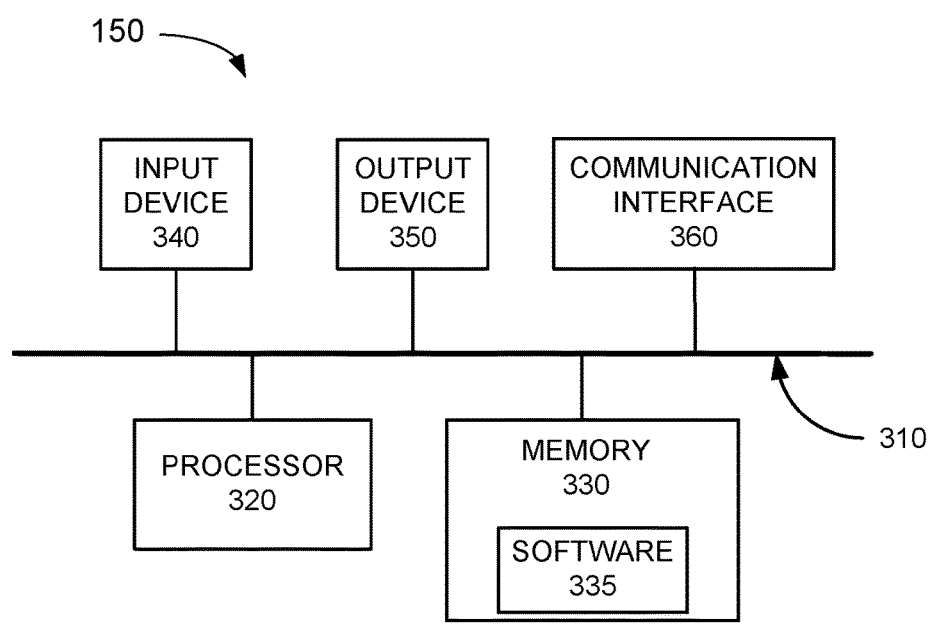
FIG. 3 is a diagram illustrating exemplary components of the OBD interface of FIG. 1.

FIG. 3 is a diagram illustrating exemplary components of TOS 150 according to an implementation described herein. As shown in FIG. 3, TOS 150 may include a bus 310 that provides a path that permits communication among a processor 320, a memory 330 that stores software 335, an input device 340, an output device 350, and a communication interface 360.

Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. As an example, with reference to TOS 150, software 335 may include an application that, when executed by processor 320, provides the functions of network connectivity management, as described herein. Also, software 335 may include an application that, when executed by processor 320, provides the functions related to transmitting a message and/or a reminder between user device 130 and OBD interface 120, as described herein. For example, TOS 150 may identify a text message associated with user device 130 to be a "reminder," and may convert the text message to an audio file and transmit the audio file to OBD interface 120. Software 335 may also include firmware, middleware, microcode, hardware description language (HDL), and/or other form of instruction. Software 335 may further include an operating system.

Input device 340 may allow an operator to input information into TOS 150. Input device 340 may include, for example, a keyboard, a mouse, a pen, a microphone, a remote control, an audio capture device, an image and/or video capture device, a touch-screen display, and/or another type of input device. In some embodiments, TOS 150 may be managed remotely and may not include input device 340. In other words, TOS 150 may be "headless" and may not include a keyboard, for example.

Output device 350 may output information to an operator of TOS 150. Output device 350 may include a display, a printer, a speaker, and/or another type of output device. For example, TOS 150 may include a display, which may include a liquid-crystal display (LCD) for displaying content to a user. In some embodiments, TOS 150 may be managed remotely and may not include output device 350. In other words, TOS 150 may be "headless" and may not include a display, for example.

Communication interface 360 may include a transceiver that enables TOS 150 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, TOS 150 may perform certain operations relating to forwarding a reminder from user device 130 to OBD interface 120. TOS 150 may perform these operations in response to processor 320 executing software 335 instructions contained in a computer-readable medium, such as memory 330. A computer-readable medium may be defined as a non-transitory memory device. A memory device may be implemented within a single physical memory device or spread across multiple physical memory devices. Software 335 instructions may be read into memory 330 from another computer-readable medium or from another device. Software instructions 335 contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of TOS 150, in other implementations, TOS 150 may include fewer components, different components, additional components, or differently arranged components than those depicted in FIG. 3. Additionally or alternatively, one or more components of TOS 150 may perform one or more tasks described as being performed by one or more other components of TOS 150.

Figure 4:
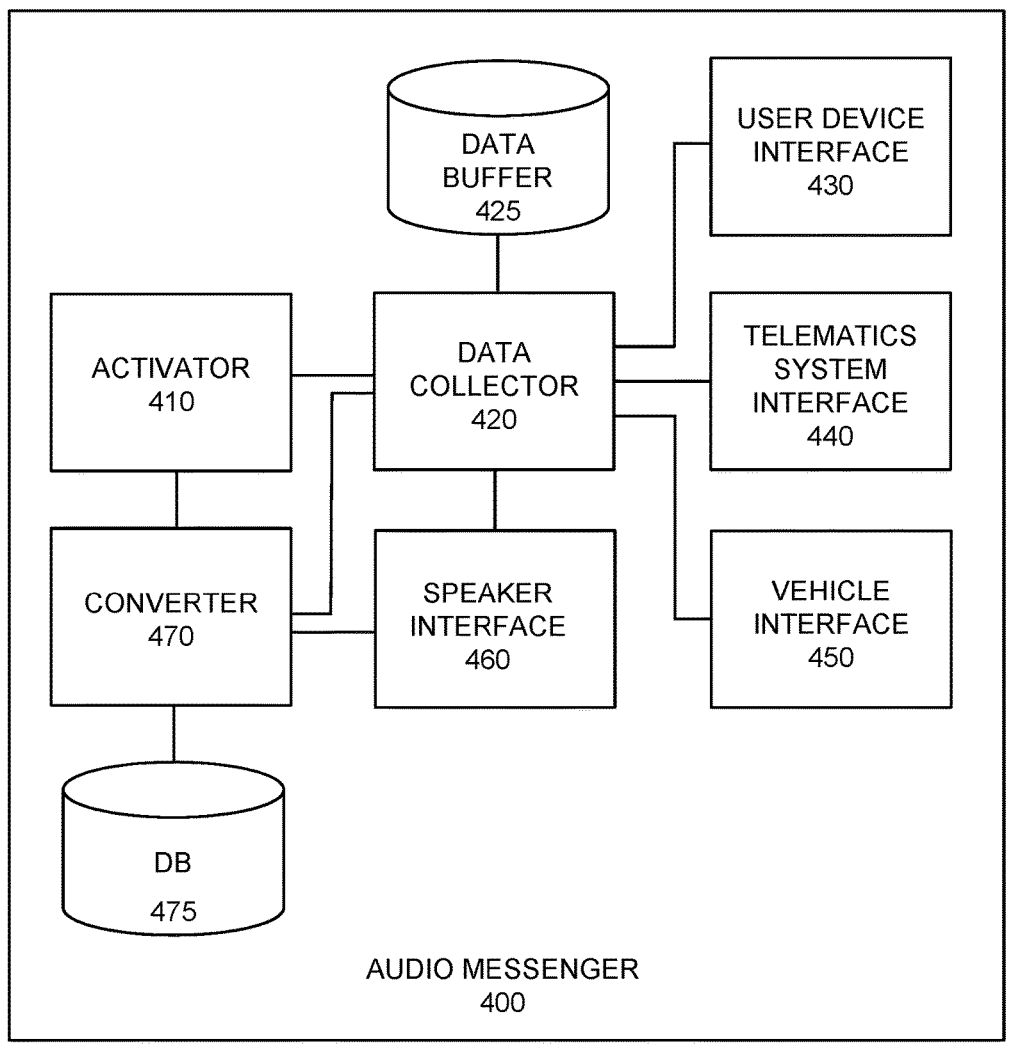
FIG. 4 is a diagram illustrating exemplary functional components of an audio messenger that may be implemented in one or more of the devices of FIG. 1.

FIG. 4 is a diagram illustrating exemplary functional components of an audio messenger 400 according to a first implementation described herein. Audio messenger 400 may be implemented, for example, via processing unit 210 of device 200 (e.g., OBD interface 120, vehicle computer device 115, user device 130, etc.) executing instructions from memory 220. Alternatively, some or all of the functionality of audio messenger 400 may be implemented via hard-wired circuitry. In other implementations, some or all of the functionality of audio messenger 400 may be implemented via processor 320 executing software 335 instructions from memory 330 of TOS 150.

As shown in FIG. 4, audio messenger 400 may include an activator 410, a data collector 420, a data buffer 425, a user device interface 430, a telematics system interface 440, a vehicle interface 450, a speaker interface 460, a converter 470, and a database (DB) 475.

Activator 410 may activate audio messenger 400 in response to detecting a key-on event. The key-on event may include detecting vehicle 110 being started, an acceleration of vehicle 110, detecting a change in location of vehicle 110, detecting a short range wireless signal associated with user device 130, and/or another type of indication that vehicle 110 is in a state of operation. Activator 410 may instruct data collector 420 to collect data associated with the key-on event.

Data collector 420 may collect data from one or more data sources and may store the data in data buffer 425. In some implementations, data collector 420 may collect the data at particular intervals, even if device 200 is in an idle mode, so that data collected in a time period before the key-on event (e.g., a few seconds before the key-on event) may be obtained. Thus, data buffer 425 may be re-written at particular intervals and may include the most recently obtained data before and after the key-on event. Data collector 420 may collect data from accelerometer 260 and/or other sensors, from one or more microphones, from one or more user devices 130 and/or from base station 145, from one or more vehicle sensors, and/or from other sources of data. Data collector 420 may provide the collected data to speaker interface 460.

User device interface 430 may be configured to communicate with user devices 130 located inside and/or proximate to vehicle 110. As an example, user device interface 430 may detect short range wireless signals emitted by user devices 130. As another example, user device interface 430 may request, via a short range wireless signal, information from user device 130, such as location information, audio signals captured by user device 130, whether user device 130 is in motion, etc.

Telematics system interface 440 may be configured to communicate with TOS 150. For example, in some implementations, TOS 150 may perform some or all of the processing performed by audio messenger 400 and audio messenger 400 may exchange information with TOS 150. As an example, in some implementations, converter 470 may be implemented by TOS 150. As another example, TOS 150 may obtain information relating to the location of user devices 130 from base station 145 and may provide the obtained information to audio messenger 400.

Vehicle interface 450 may be configured to communicate with vehicle computer device 115 and/or with other components of vehicle 110, such as one or more vehicle sensors and/or one or more components with configurable settings. Vehicle interface 450 may utilize an OBD I port, and OBD II port, and/or another type of port.

Speaker interface 460 may be configured to communicate with speaker device 125. For example, in some implementations, speaker interface 460 may use short range wireless signals emitted to transmit audio messages retrieved from DB 475 and/or other information to speaker device 125 for output to an occupant of vehicle 110. For example, speaker interface 460 may transmit data indicating that one or more messages for the occupant of vehicle 110 are pending, based on information received from activator 410, for example, associated with a key-on event detected for vehicle 110.

Converter 470 may be configured to convert a text message into an audio file. For example, audio messenger 400 may receive a text message associated with a subscriber of TOS 150, which is determined to be a "reminder" for the subscriber, and may convert the text message into an audio message. For example, converter 470 may convert the text message into any audio file format, such as a WAV file, an MP3 file, a Windows™ media audio (WMA) file, etc., and/or any other type of audio fie. In one implementation, converter 470 may convert the text message into more than one type of audio file.

DB 475 may be configured to store audio files received from converter 470. Audio files stored in DB 475 may be retrieved for sending to speaker device 125 based on detection of a key-on event associated with vehicle 110. DB 475 may store a pending audio message, for example, that has been sent to speaker device 125, but not output by speaker device 125. A non-pending audio file stored in DB 125 may be deleted from DB 475 based on information indicating that the audio message has been output by speaker device 125.

Although FIG. 4 shows exemplary functional components of audio messenger 400, in other implementations, audio messenger 400 may include fewer functional components, different functional components, differently arranged functional components, or additional functional components than depicted in FIG. 4. Additionally, or alternatively, one or more functional components of audio messenger 400 may perform functions described as being performed by one or more other functional components of audio messenger 400.

Figure 5:
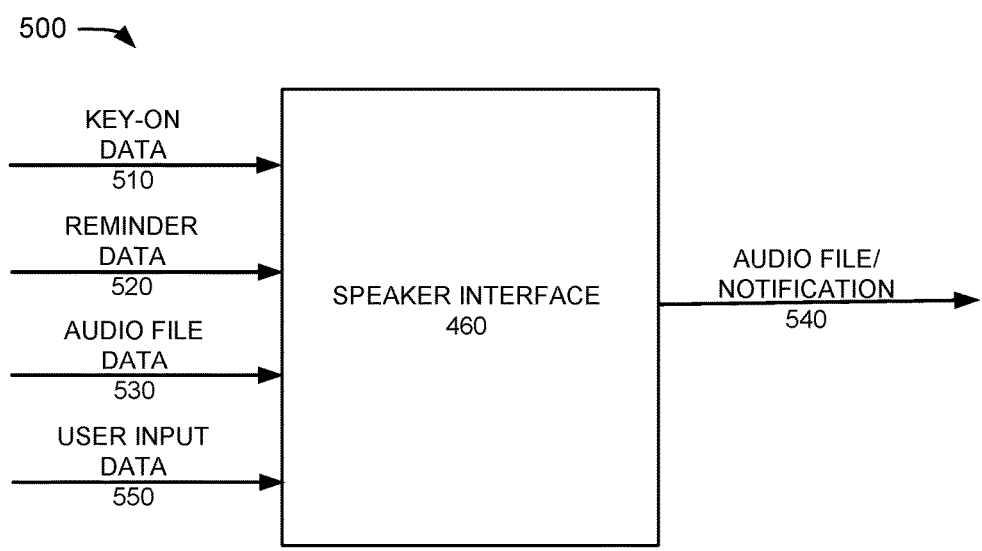
FIG. 5 is a diagram illustrating exemplary inputs and output of the speaker interface of FIG. 4.

FIG. 5 is a diagram illustrating exemplary inputs to speaker interface 460. As shown in FIG. 5, speaker interface 460 may include a key-on data 510 input, a reminder data 520 input, an audio file data 530 input, an audio file/notification 540 output, and/or a user input data 550 input.

Key-on data 510 may include sensor information such as accelerometer data from one or more accelerometer sensors associated with vehicle 110, such as accelerometer 260 and/or another accelerometer included in vehicle 110. Accelerometer data may correspond to movement and/or operation of vehicle 110. Key-on data may also correspond to turning on the ignition of vehicle 110 (e.g., starting the car). Speaker interface 460 may determine that the accelerometer data and/or ignition data corresponds to a key-on event for vehicle 110. In one embodiment, a component other than speaker interface 460 in audio messenger 400 (e.g., vehicle interface 450) may make the key-on determination which may then be input to speaker interface 460 in key-on data 510.

Reminder data 520 may include a message received from TOS 150 that includes an identifier indicating that the message is a "reminder" for the subscriber. Reminder data 520 may be retrieved from TOS 150 based on detection of a key-on event. For example, audio messenger 400 may pull and/or retrieve messages identified as reminders, from TOS 150 based on a key-on determination associated with vehicle 110. The reminders may be received at OBD interface 120 from TOS 150 as text messages (short messaging service (SMS) messages). Speaker interface 460 may determine that a message corresponds to a reminder for the subscriber. In one embodiment, a component other than speaker interface 460 in audio messenger 400 (e.g., user device interface 430) may make the reminder determination which may then be input to speaker interface 460 in reminder data 520.

Audio file data 530 may include audio messages that correspond to converted text messages identified as reminders. For example, speaker interface 460 may determine that a reminder contained in reminder data may be a text message that is to be converted into an audio file. Speaker interface 460 may direct, for example, converter 470 to convert a reminder into a particular audio format. In one embodiment, a component other than speaker interface 460 in audio messenger 400 (e.g., converter 470) may make the conversion determination which may then be input to speaker interface 460 in audio file data 530.

Audio file/notification 540 may include a notification output (e.g., via a Serial Port Profile (SPP) connection) from audio messenger 400 of OBD reader 120 to speaker device 125 based on audio file data 530, for example. Notification 540 may indicate a number of audio reminders that are pending for presentation in vehicle 110, for the subscriber. Notification 540 may prompt the occupant of vehicle 110 for an input related to the pending audio reminders. For example, speaker device 125 may, based on notification 540, illuminate an indicator, configure an LCD, emit an audible alert, etc., to indicate to an occupant of vehicle 110 that one or more audio reminders at OBD interface 120 are pending.

User input data 550 may include data received from speaker device 125, for example, responsive to notification 540, indicating that an occupant of vehicle 110 has requested that one or more of the pending audio reminders at OBD interface 120 are to be output via speaker device 125. In one implementation, user input data 550 may identify the number of audio reminders that are to be forwarded to speaker device 125.

Audio file/notification 540 may include one or more audio reminders corresponding to user input data received from an occupant of vehicle 110, requesting that the audio reminders be presented via speaker device 125. For example, OBD interface 120 may establish a short-range connection to speaker device 125 that is capable of communicating the requested audio file/notification 540. In some implementations, OBD interface 120 may automatically establish a connection to speaker device 125 to push one or more pending audio reminders to speaker device 125, for example, responsive to detection of a key-on event for vehicle 110. In one implementation, OBD interface 120 may not generate a notification alerting an occupant of vehicle 110 of the pending reminder.

Although FIG. 5 shows exemplary inputs and outputs of speaker interface 460, in other implementations, speaker interface 460 may include fewer inputs, different inputs, differently arranged inputs, or additional inputs and/or outputs than depicted in FIG. 5.

Figure 6:
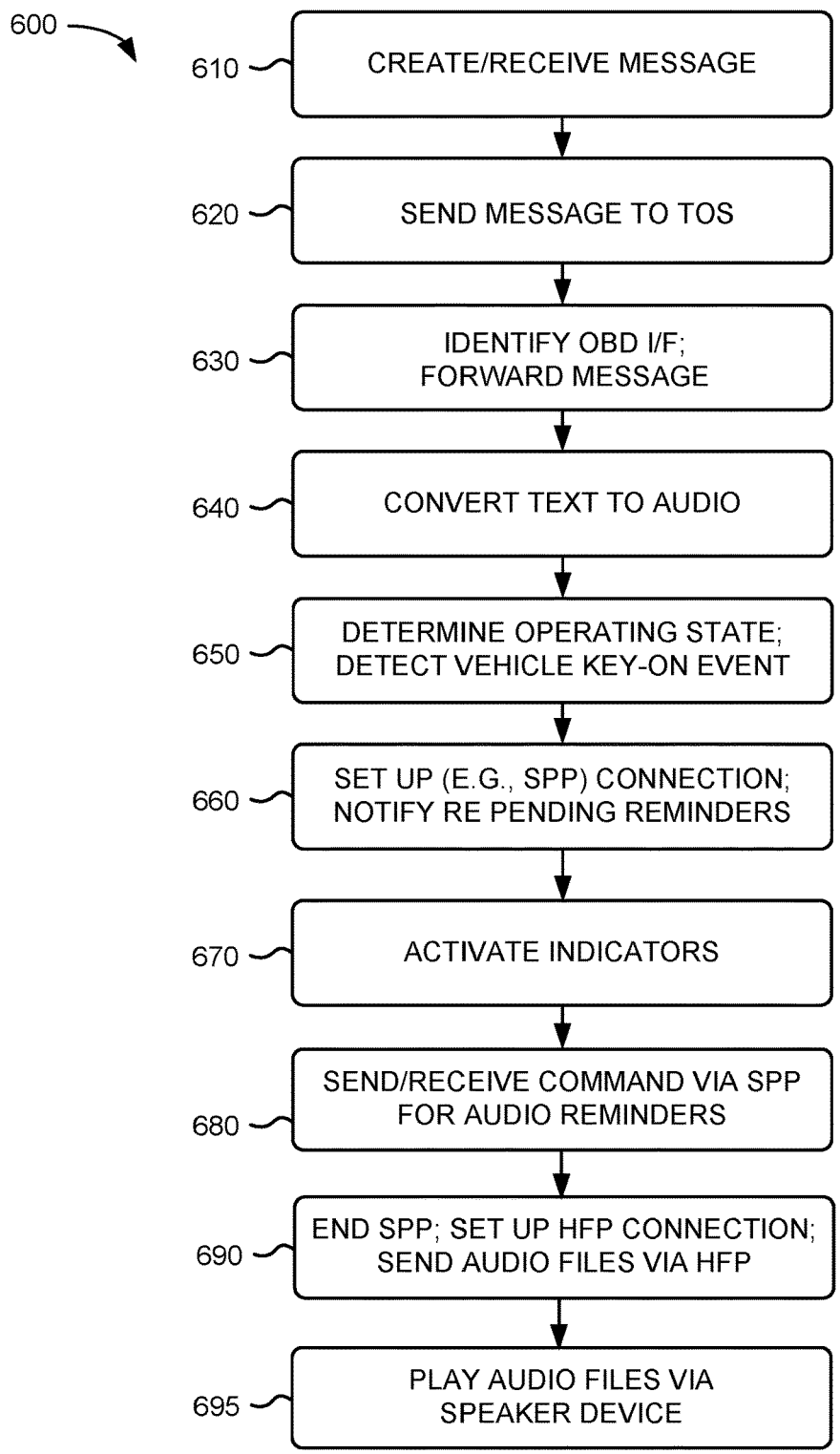
FIG. 6 is a flowchart of a process for providing audio reminders via the vehicle's OBD system according to an implementation described herein.

FIG. 6 is a flowchart of an exemplary process 600 for presenting audio reminders to an occupant of vehicle 110 according to an implementation described herein. In some implementations, operations depicted in FIG. 6 may be performed by vehicle computer device 115, OBD interface 120, speaker device 125, and/or user device 130, individually or in combination. In other implementations, some aspects of process 600 may be performed by another device or a group of devices separate from the exemplary devices. For example, some or all of the blocks of process 600 may be performed by TOS 150.

Process 600 may include user device 130, associated with a subscriber to a telematics service, receiving and/or being used to create a message for the subscriber (block 610). For example, the subscriber may use an application ("app") that is resident on mobile device 130 to enter one or more messages comprising text, for example, to serve as reminders. Upon entry of the messages, the mobile app on user device 130 may transmit the messages over a connection established via network 140 to TOS 150 (block 620).

TOS 150 may determine that the messages are associated with the subscriber and may identify OBD interface 120 as being associated with the subscriber, for example, using an identifier associated with the subscriber, the mobile app, and/or user device 130. TOS 150 may identify the subscriber and/or OBD interface 120 based on information associated with user device 130. TOS 150 may tag or otherwise identify the messages as "reminder" for the subscriber. For example, the messages may include information indicating that the subscriber has identified the messages as reminders. In one embodiment, a drop-down menu may be presented to the subscriber when using the mobile app on user device 130, from which the subscriber may select "reminder" from multiple selectable categories. In one embodiment, the subscriber may speak "reminder" before and/or after inputting a voice message. For messages that have not already been identified as reminders, TOS 150 may examine the messages to identify key terms (e.g., imperatives), such as "remember," "get," "pick up," "go," "call," etc., and may determine whether the messages constitute a reminder based on the identified key terms. For example, TOS 150 may determine that a message includes key terms that amount to an instruction to the subscriber to take some action.

TOS 150 may establish a connection to OBD interface 120 via network 140 for forwarding the messages (block 630). OBD interface 120 may receive (e.g., via telematics system interface 440 of audio messenger 400) the messages, and convert the text of the messages to audio (block 640). For example, audio messenger 400 may identify the messages as "reminders," and direct converter 470 to convert the text of the messages to an audio file format that is compatible with speaker device 125. The audio files containing the messages may be stored, for example, in DB 475 of audio messenger 400.

Process 600 may further include OBD interface 120 determining an operating state of vehicle 110, and based upon a determination that vehicle 110 is not currently being operated, OBD interface 120 may detect the next key-on event that occurs, for example, based on sensor data and/or other information relating to the operation and/or movement of vehicle 110 (block 650). For example, audio messenger 400 may obtain engine ignition data (e.g., on/off parameters), accelerometer data from one or more accelerometer sensors associated with vehicle 110, such as accelerometer 260 and/or another accelerometer included in vehicle 110, etc. The accelerometer data may include an amplitude spike following an idle event.

Upon detection of the key-on event (e.g., vehicle 110 is in operation), OBD interface 120 may determine an availability of a wireless connection with which to connect to speaker device 125. If no such connection currently exists, a low-payload capacity protocol for connecting Bluetooth™-enable devices (e.g., Serial Port Profile (SPP)) may be established, or another type of connection may be established, via which OBD interface 120 may send a notification to speaker device 125 that one or more reminders are pending (block 660), for example, within 15-120 seconds after the key-on event. Based on the notification, speaker device 125 may activate an indicator on speaker device 125 to alert an occupant (e.g., the subscriber) of vehicle 110 of the pending messages and/or the number of messages pending (block 670). As an example, speaker device 125 may include one or more LED lights, buttons, icons, etc., an LED readout, an audible signal, and/or haptic technology to alert the occupant of vehicle 110 of the pending messages. The indications may stay activated (e.g., glow) until an occupant of vehicle 110 presses a button or switch or otherwise acknowledges the indications, to request one or more of the pending audio reminders. In one implementation, the indicators cease to be activated when a determination is made that vehicle 110 is no longer being operated (e.g., vehicle 110 is turned off).

In some embodiments, OBD interface 120 may not send the notification and/or audio file to speaker device until a determination is made that user device 130 and vehicle 110 are at the same location. For example, data collector 420 may obtain location information (e.g., GPS data) for user device 130 via user device interface 430 and/or telematics system interface 440, and location information (e.g., GPS data) for vehicle 110 via telematics system interface 440 and/or vehicle interface 450. Audio messenger 400 may compare vehicle 110's location to user device 130's location, and determine whether user device 130 is in proximity to vehicle 110.

If an initial determination is made after detection of the key-on event (i.e., operation of vehicle 110) that user device 130 is not near vehicle 110, then OBD interface 120 may not send the notification and/or audio file to speaker device 125. If a subsequent determination is made that user device 130 is near vehicle 110, then OBD interface 120 may send the notification and/or audio file to speaker device 125. In other words, determining that user device 130 is in vehicle 110 may trigger the presentation of pending audio reminders via speaker device 125. In other embodiments, determining that vehicle 110 is approaching or has moved within the vicinity of a location associated with an audio reminder may trigger the presentation of pending audio reminders via speaker device 125. For example, OBD interface 120 may, in the course of parsing a text message, identify a location associated with the reminder (e.g., a street address, a store name), and audio messenger 400 may compare the identified location to vehicle 110's location (e.g., determined using GPS data received via telematics system interface 440 and/or vehicle interface 450), and when the two locations substantially match, OBD interface 120 may send the notification and/or audio file to speaker device 125.

Based on an occupant (e.g., driver or passenger) input corresponding to a request to play one or more of the pending audio messages, speaker device 125 may transmit a command to OBD interface 120 via the first type of Bluetooth™ connection (e.g., SPP) identifying the one or more requested audio messages (block 680). Based on the command, OBD interface 120 may terminate the first type (e.g., SPP) of connection to speaker device 125; establish a second type of Bluetooth™ connection, for example, a hands-free protocol (HFP) or another protocol with sufficient payload to transfer audio files between Bluetooth™-enabled devices, to speaker device 125; and transfer the one or more audio files containing the requested audio reminders to speaker device 125 (block 690).

One or more of the transferred audio files may be presented via speaker device 125, within 15-120 seconds, for example, automatically and/or based on additional occupant input received at speaker device 125 (block 695). Speaker device 125 may send an indication to OBD interface 120 indicating which of the forwarded messages have been played. OBD interface 120 may delete, for example, from DB 475 of audio messenger 400, the audio reminders that have been played. Speaker device 125 may maintain the indication of the pending audio reminders that have not been played, and the pending audio reminders may not be deleted from DB 475.

Figure 7:
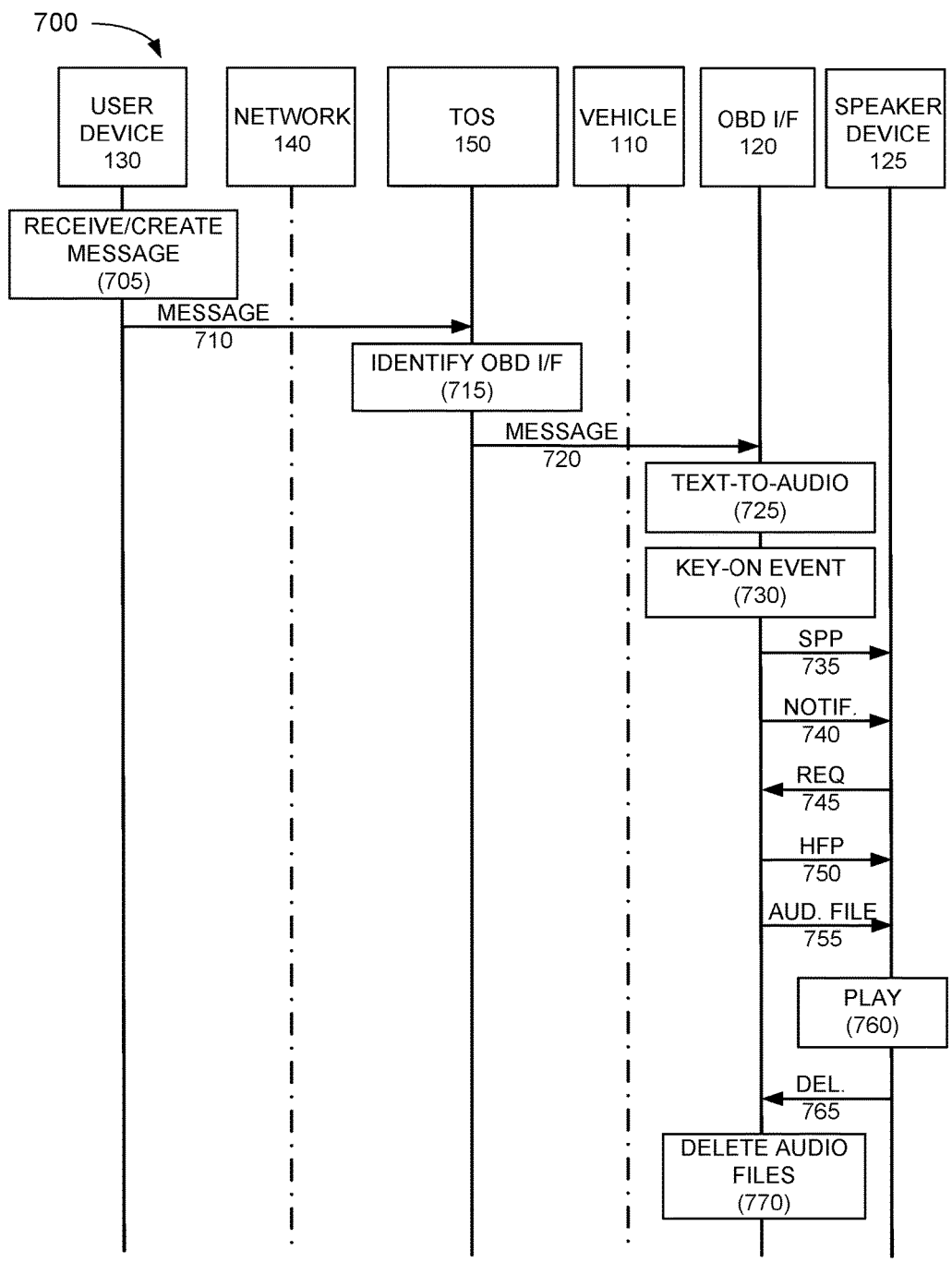
FIG. 7 is an exemplary signal flow diagram according to an implementation described herein.

FIG. 7 is an exemplary signal flow diagram 700 according to an implementation described herein. Signal flow 700 may include user device 130 receiving or creating a message, such as a text message (block 705). For example, a user (e.g., subscriber) of user device 130 may select from a menu presented by a telematics service-related app to set a reminder. The telematics service-related app may cause user device 130 to send the text message to TOS 150 (signal 710). TOS 150 may examine the text message and identifying metadata to identify the subscriber, user device 130, and/or OBD interface 120 (block 715). In some cases, more than one OBD interface 120 may be associated with the subscriber and/or user device 130.

Based on the identifying information, TOS 150 may determine whether a connection exists and/or whether to establish a connection to the identified OBD interface 120 via network 140. In either case, TOS 150 may connect to OBD interface 120, and may send the message via network 140 to OBD interface 120 in vehicle 110 (signal 720). OBD interface 120 may determine that the message is a reminder that is to be converted from text to audio. OBD interface 120 may convert the message to an audio file or may request another entity (e.g., Nuance™) to perform the conversion.

OBD interface 120 may determine whether vehicle 110 is in operation. If vehicle 110 is not in operation, OBD interface 120 may collect vehicle sensor information to detect a key-on event indicating that vehicle 110 is currently in operation (block 730). Based on the detection of the key-on event, OBD interface 120 may establish a first Bluetooth™ connection (e.g., SPP) or another type of connection to speaker device 125 (signal 735). OBD interface 120 may send a notification of the pending audio reminder to speaker device 125 over the first Bluetooth™ connection (signal 740).

Speaker device 125 may display or otherwise present the notification of the pending audio reminder to an occupant (e.g., driver and/or passenger) of vehicle 110 (block 745). The occupant may respond to the notification with user input into speaker device 125 requesting that the audio message be presented, and a command may be sent from speaker device 125 to OBD interface 120 via the first Bluetooth™ connection or another type of connection (signal 750). In response, OBD interface 120 may end the first Bluetooth™ connection, and establish a second Bluetooth™ connection to speaker device 125 (signal 755). OBD interface 120 may send the audio reminder via the second Bluetooth™ connection to speaker device 125 (signal 760).

Speaker device 125 may play the forwarded audio file automatically or based on user input received at speaker device 120 (block 765). Speaker device 120 may send a signal to OBD interface 120 indicating that the audio reminder has been played (signal 770). Based on the signal, OBD interface 120 may delete the audio reminder and audio files from DB 475 or other storage (block 775). Speaker device 125 may deactivate the notification indicator when the corresponding audio reminder is played.

In addition to presenting "reminders," the detection of a key-on event may trigger the audio presentation of, for example, a news events and/or traffic information corresponding to time-of-day information and/or location information associated with the location of the vehicle and/or the user device. Other audio presentations are possible.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIG. 6 and series of signal flows have been described with respect to FIG. 7, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof The term "logic," as used herein, may refer to a combination of one or more processors configured to execute instructions stored in one or more memory devices, may refer to hardwired circuitry, and/or may refer to a combination thereof. Furthermore, logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by an on-board diagnostic (OBD) interface coupled to a diagnostic port of a vehicle, the method comprising:
receiving, by the OBD interface via a wireless network, a message comprising text from a user device associated with a user;
converting, by the OBD interface, the text into an audio file that corresponds to an audio reminder;
detecting, by the OBD interface, a key-on event for the vehicle;
establishing, by the OBD interface responsive to the key-on event, a first wireless connection to a speaker device located in the vehicle;
sending, by the OBD interface via the first wireless connection, a notification to the speaker device that the audio reminder is pending;
terminating, by the OBD interface after the notification is sent, the first wireless connection;
establishing, by the OBD interface, a second wireless connection to the speaker device; and
transferring, by the OBD interface, the audio file to the speaker device via the second wireless connection.

2. The method of claim 1, further comprising:
receiving, at the OBD interface responsive to the notification, a request for the audio reminder, wherein terminating the first wireless connection is responsive to receiving the request.

3. The method of claim 1, further comprising:
collecting, at the OBD interface, vehicle information from one or more sensors, wherein detecting the key-on event is based on the vehicle information.

4. The method of claim 3, wherein the vehicle information comprises vehicle operation data associated with the vehicle.

5. The method of claim 1, further comprising:
storing, by the OBD interface, the audio reminder;
receiving, at the OBD interface and from the speaker device, an indication that the audio reminder has been presented via the speaker device; and
deleting, by the OBD interface, the audio reminder from storage responsive to the indication that the audio reminder has been presented.

6. The method of claim 1, further comprising:
receiving, at the OBD interface, a first location associated with the vehicle;
receiving, at the OBD interface, a second location associated with the user device; and
determining, at the OBD interface, that the first location and the second location are a same location, wherein sending the notification to the speaker device is responsive to the determination that the first and second locations are the same location.

7. The method of claim 1, further comprising:
determining, at the OBD interface, a first location associated with the audio reminder;
determining, at the OBD interface, a second location of the vehicle;
comparing, by the OBD interface, the first location to the second location; and
determining, by the OBD interface and based on the comparing, that the first and second locations are a same location, wherein sending the notification to the speaker device is based on the determination that the first and second locations are the same location.

8. An on-board diagnostic (OBD) interface to couple to a diagnostic port of a vehicle, the OBD interface comprising:
a communication interface;
a memory storing instructions; and
one or more processors to execute the instructions to:
receive, by the communication interface via a wireless network, a message comprising text from a user device associated with a user;
convert the text into an audio file that corresponds to an audio reminder;
detect a key-on event for the vehicle;
establish, responsive to the key-on event, a first wireless connection to a speaker device located in the vehicle;
send, by the communication interface via the first wireless connection, a notification to the speaker device that the audio reminder is pending;
terminate, after the notification is sent, the first wireless connection;
establish a second wireless connection to the speaker device; and
transfer, by the communication interface via the second wireless connection, the audio file to the speaker device.

9. The OBD interface of claim 8, wherein the one or more processors further execute the instructions to:
receive, responsive to the notification, a request for the audio reminder, wherein termination of the first wireless connection is responsive to the receipt of the request.

10. The OBD interface of claim 8, wherein the one or more processors further execute the instructions to:
collect vehicle information from one or more sensors, wherein the detection of the key-on event is based on the vehicle information.

11. The OBD interface of claim 10, wherein the vehicle information comprises vehicle operation data associated with the vehicle.

12. The OBD interface of claim 8, wherein the one or more processors further execute the instructions to:
store the audio reminder;
receive, from the speaker device, an indication that the audio reminder has been presented via the speaker device; and
delete the audio reminder from storage responsive to the indication that the audio reminder has been presented.

13. The OBD interface of claim 8, wherein the one or more processors further execute the instructions to:
receive a first location associated with the vehicle;
receive a second location associated with the user device; and
determine that the first location and the second location are a same location, wherein the one or more processors execute the instructions to send the notification to the speaker device is responsive to the determination that the first and second locations are the same location.

14. The OBD interface of claim 8, wherein the one or more processors further execute the instructions to:
determine a first location associated with the audio reminder;
determine a second location of the vehicle;
compare the first location to the second location; and
determine, based on the comparison, that the first and second locations are a same location, wherein the one or more processors execute the instructions to send the notification to the speaker device is based on the determination that the first and second locations are the same location.

15. A non-transitory, computer-readable storage medium storing instructions executable by a processor of a computational device of an on-board diagnostic (OBD) interface coupled to a diagnostic port of a vehicle, which when executed cause the computational device to:
receive, via a wireless network, a message comprising text from a user device associated with a user;
convert the text into an audio file that corresponds to an audio reminder;
detect a key-on event for the vehicle;
establish, responsive to the key-on event, a first wireless connection to a speaker device located in the vehicle;
send, via the first wireless connection, a notification to the speaker device that the audio reminder is pending;
terminate, after the notification is sent, the first wireless connection;
establish a second wireless connection to the speaker device; and
transfer, via the second wireless connection, the audio file to the speaker device.

16. The non-transitory, computer-readable storage medium of claim 15, wherein executing the instructions further cause the computational device to:
receive, responsive to the notification, a request for the audio reminder, wherein termination of the first wireless connection is responsive to the receipt of the request.

17. The non-transitory, computer-readable storage medium of claim 15, wherein executing the instructions further cause the computational device to:
collect vehicle information from one or more sensors, wherein the detection of the key-on event is based on the vehicle information, and wherein the vehicle information includes vehicle operation data associated with the vehicle.

18. The non-transitory, computer-readable storage medium of claim 15, wherein executing the instructions further cause the computational device to:
store the audio reminder;
receive, from the speaker device, an indication that the audio reminder has been presented via the speaker device; and
delete the audio reminder from storage responsive to the indication that the audio reminder has been presented.

19. The non-transitory, computer-readable storage medium of claim 15, wherein executing the instructions further cause the computational device to:
receive a first location associated with the vehicle;
receive a second location associated with the user device; and
determine that the first location and the second location are a same location, wherein the computational device executes the instructions to send the notification to the speaker device is responsive to the determination that the first and second locations are the same location.

20. The non-transitory, computer-readable storage medium of claim 15, wherein executing the instructions further cause the computational device to:
determine a first location associated with the audio reminder;
determine a second location of the vehicle;
compare the first location to the second location; and
determine, based on the comparison, that the first and second locations are a same location, wherein the computational device executes the instructions to send the notification to the speaker device is based on the determination that the first and second locations are the same location.

* * * * *